B. F. McELWEE
CUTTER BAR.
APPLICATION FILED JULY 6, 1908.
909,646.
Patented Jan. 12, 1909.
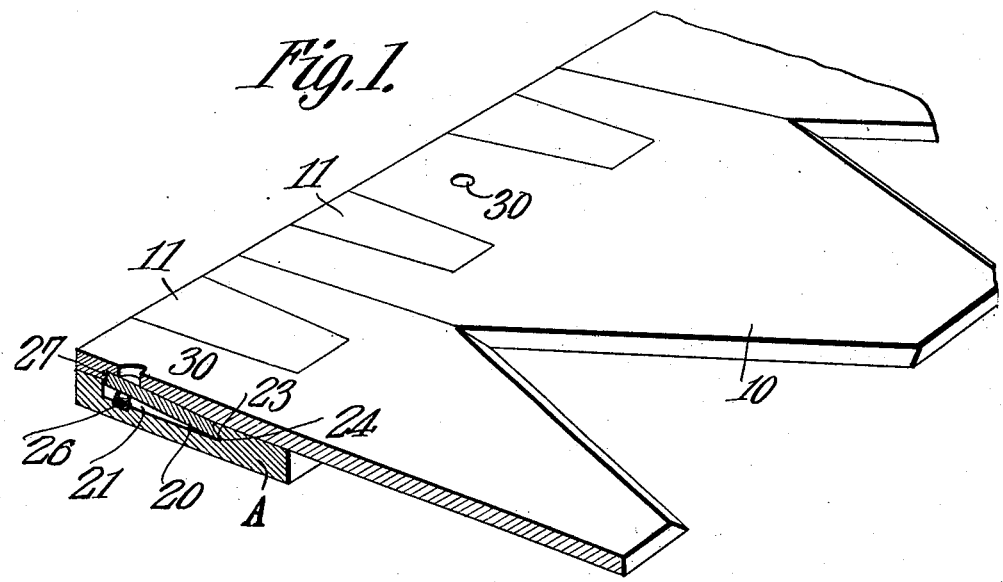
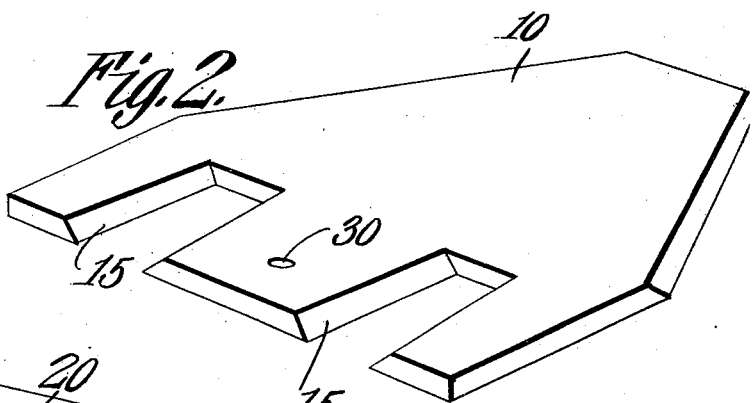
Witnesses
Inventor
Bernard F. McElwee.
By C. A. Snow & Co.
Attorneys

UNITED STATES PATENT OFFICE.

BERNARD F. McELWEE, OF DUNMORE, WEST VIRGINIA.

CUTTER-BAR.

No. 909,646.　　　　Specification of Letters Patent.　　　　Patented Jan. 12, 1909.

Application filed July 6, 1908. Serial No. 442,060.

*To all whom it may concern:*

Be it known that I, BERNARD F. MC-ELWEE, a citizen of the United States, residing at Dunmore, in the county of Pocahontas and State of West Virginia, have invented a new and useful Cutter-Bar, of which the following is a specification.

This invention relates to cutter bars employed on mowing and harvesting machines and has for its principal object to provide means for readily detaching separate cutter blades from the bar for the purpose of sharpening or renewing the same.

A further object of the invention is to provide an improved form of connection between the cutter blades and bar, the connection being in the form of a spring lock that is effectually protected and concealed by the bar proper and the blade so that the spring lock cannot become gummed or clogged to such an extent as to render it inoperative.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings:—Figure 1 is a perspective view of a portion of a cutter bar constructed in accordance with the invention. Fig. 2 is a detail perspective view of one of the cutter blades detached. Fig. 3 is a similar view of one of the spring actuated locking tongues.

Similar numerals of reference are employed to indicate the corresponding parts throughout the several figures of the invention.

The cutter bar A is of any desired shape and size and is arranged to be operated in any suitable manner. On one face of the cutter bar, either the upper or lower, is arranged a number of tapered lugs 11, two of such lugs being preferably employed for the reception of the edge of each cutter blade 10. These lugs taper in width from back to front and their opposite sides are undercut in order to engage the similarly tapered walls of recesses 15, that are cut in the rear edges of the cutter blades, thus forming a dove-tailed or wedge shaped interlock, that will firmly hold the blade from vertical and rearward movement, while the removal of the blade in a forward direction is prevented by a spring locking tongue 20 of which there is one for each blade.

The face of the cutter bar is provided with a number of angular recesses 21 of such shape and size as to accommodate the locking tongues 20 and from the forward edge of each tongue projects an ear 23 that engages an undercut notch 24 in the forward wall of the recess or depression 21, this ear forming a pivot on which the tongue may swing. The free end of the tongue when forced upward by a small helical spring 26 which acts to hold the tongue in engagement with a recess 27 that is formed in the inner face of the cutter blade, and has its bottom inclined to the face of the blade on a line following that assumed by the tongue when in locking position. The rear end of the tongue abuts against the rear wall of this recess while the forward end of the tongue abuts against the forward wall of the recess 21 of the cutter bar so that the blade is firmly locked in and cannot be removed until the locking tongue is forced downward out of the recess 27.

On the upper face of the cutter bar are arranged openings 30, one of such openings being placed immediately above each of the spring tongues so that by inserting a suitable tool through the opening the tongue may be forced down until it is clear of recess 27 whereupon the cutter blade may be drawn off at the front of the cutter bar for sharpening, repairs, or renewal. When the blade is placed in position it is merely slid into place and as the blade slides over the tongue the latter will be pressed into the recess 21 until the rear end of the recess 27 of the blade passes beyond the rear end of the tongue whereupon the latter will spring upward into locking position and firmly hold the blade in place.

One of the principal advantages of this locking device is that the spring tongue is concealed and is fully protected between the cutter bar and the blade so that it is impossible for dirt or foreign matter to enter the spring recess and render the device inoperative.

I claim:—

1. In combination, a cutter bar, a detachable cutter blade, the bar and blade having opposing recesses, and a yieldably mounted locking tongue arranged in said recesses and serving to hold the blade in position.

2. In combination, a cutter bar, a detachable cutter blade, the bar and blade having opposing recesses, said blade being provided with an opening communicating with the recesses, and a yieldably mounted locking tongue arranged in the recesses and serving to hold the blade in position.

3. In combination, a recessed cutter bar having dovetailed lugs, a detachable recessed cutter blade having grooves to receive the lugs, the blade being slidable to and from position, and a yieldably mounted blade locking tongue housed within the bar and blade recesses.

4. In combination, a recessed cutter bar having a plurality of dovetailed lugs, a recessed cutter blade having grooves for reception of said lugs, one wall of the bar recess having a notch or depression, a locking tongue disposed in the bar recess and having a pivot ear extending into said notch, and a spring tending to force the free end of the tongue into the cutter blade recess, there being an opening in the blade for the introduction of a tongue depressing tool.

In testimony that I claim the foregoing as my own, I have hereto affixed my signature in the presence of two witnesses.

BERNARD F. McELWEE.

Witnesses:
  B. NOTTINGHAM,
  J. W. SIPLE.